June 29, 1943. J. E. BUXTON 2,323,196
ENGINE STARTER GEARING
Filed July 19, 1941
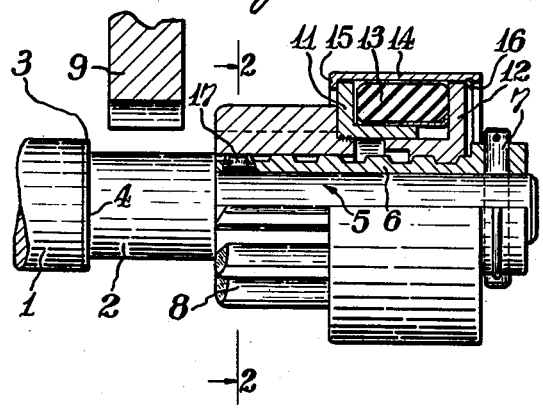
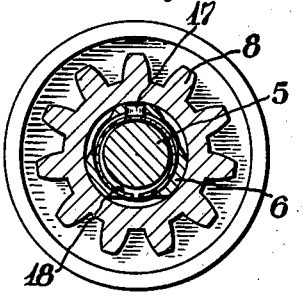
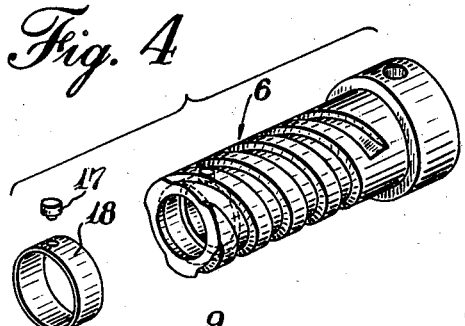
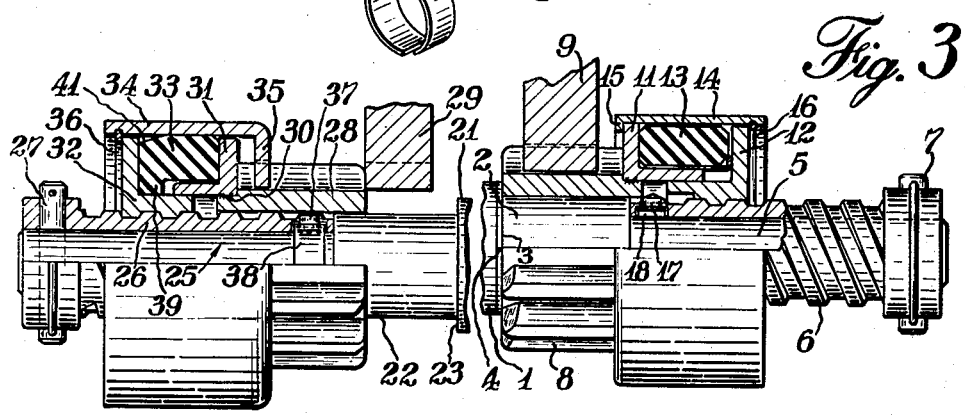
INVENTOR.
James E. Buxton
BY Clinton S. James
Witness:
Burr W. Jones Patented June 29, 1943

2,323,196

UNITED STATES PATENT OFFICE 2,323,196

ENGINE STARTER GEARING

James E. Buxton, Elmira Heights, N. Y., assignor to Bendix Aviation Corporation, South Bend, Ind., a corporation of Delaware Application July 19, 1941, Serial No. 403,182

8 Claims. (Cl. 74—7)

The present invention relates to engine starter gearing and more particularly to a drive for connecting a starting motor to a member of an engine to be started, and maintaining said connection until the engine is reliably self-operative.

It is an object of the present invention to provide a starter drive which is efficient and reliable in operation, small in size and simple and economical in construction.

It is another object to provide such a device incorporating a yielding overrunning connection.

It is a further object to provide such a device incorporating means for holding the drive in operative position as long as the starting motor is energized.

Further objects and advantages will be apparent from the following description taken in connection with the accompanying drawing in which:

Fig. 1 is a side elevation partly in section of a starter drive embodying a preferred form of the invention;

Fig. 2 is a section taken substantially on the line 2—2 of Fig. 1;

Fig. 3 is a view similar to Fig. 1 showing the parts in the positions assumed during overrunning of the engine member;

Fig. 4 is a detail in perspective of the screw shaft and detent structure shown in disassembled relation; and Fig. 5 is a view similar to Fig. 1 showing a second embodiment of the invention, the parts being shown in this position assumed in case of tooth abutment between the pinion and engine gear.

In Fig. 1 of the drawing there is illustrated a power shaft 1 having a smooth reduced portion 2 forming an abutment shoulder 3 which may be provided with a hardened thrust washer 4. The screw shaft 1 has a further reduced smooth extension 5, and a screw-threaded element in the form of a hollow screw shaft 6, fixed thereon in any suitable way as by means of a cross pin 7, the surface of the screw shaft being flush with the smooth portion 2 of the power shaft.

A pinion member 8 is slidably journalled on the screw shaft and smooth portion 2 of the power shaft for movement into and out of engagement with a member such as a gear 9 of an engine to be started. Pinion member 8 has a flange member 11 fixed thereon in any suitable manner as by brazing. A flanged nut 12 is threaded on the screw shaft 6, and a torsionally resilient overrunning connection between said flanges is provided in the form of a cylindrical block 13 of elastically deformable material such as rubber which is adapted to frictionally engage the flanges under the screwjack action of the screw shaft and nut.

Means for enclosing the elastic element 13 is provided in the form of a sleeve 14 surrounding the member 13 and the flanges of the members 11 and 12, said sleeve being provided with an inturned lip 15 at one end and a split retaining ring 16 at the other end so arranged as to limit separation of the flange members and loosely confine the elastic member 13 therebetween.

According to the present invention means are provided for holding the pinion 8 in engagement with the engine gear as long as the starting motor is energized. As here shown this means is in the form of a detent or latch member 17 mounted in the end of the screw shaft 6 and normally maintained flush with the surface of the screw shaft by yielding means such as the split spring ring 18. When the power shaft and screw shaft are rotating above a predetermined speed, the latch 17 is moved outwardly by centrifugal force, and if the pinion is at that time in engagement with the engine gear, the latch 17 will protrude back of the pinion and prevent its return to idle position as illustrated in Fig. 3. The latch 17 is also preferably arranged to frictionally engage the interior of the pinion as shown in Fig. 1, when the pinion is in idle position and thereby prevent the pinion from drifting toward the engine gear when the drive is not in operation.

In operation, starting with the parts in the positions illustrated in Fig. 1, actuation of the power shaft 1 causes the nut member 12 to thread itself along the screw shaft 6, which longitudinal motion is transmitted yieldingly through the elastic member 13 to the flange member 11 and pinion 8. When the pinion engages the thrust washer 4 on the power shaft 1, the pinion is fully meshed with the engine gear and its longitudinal motion is arrested, whereupon further longitudinal movement of the nut member 12 compresses the elastic member 13 so as to form a yielding self-tightening clutch which transmits rotation from the power shaft through the pinion to the engine gear 9.

When the engine fires, the acceleration of the engine gear causes the pinion 8 to overrun the drive and the nut 12 is thereby accelerated and threads itself back along the screw shaft 6. Since the starting motor is energized, however, the power shaft is rotated with sufficient speed to cause the latch 17 to protrude from the screw shaft in the path of the pinion and prevent the pinion from demeshing from the engine gear. Since the pinion is so held, while the nut member 12 is free to return toward its idle position so far as permitted by the sleeve 14, the yielding member 13 is released from the flanges as indicated in Fig. 3 and the pinion member is permitted to overrun freely.

If the engine fails to continue to be self-operative, the deceleration of the engine gear permits the power shaft to overtake and drive the pinion, and cranking is resumed. When the engine becomes reliably self-operative, the starting motor is deenergized by the operator, and when the rotation of the power shaft falls below the predetermined minimum, the latch 17 is withdrawn by the spring 18 and the pinion and associated parts are permitted to return to idle position where they are frictionally retained by the engagement of the member 17 with the interior of the pinion.

In Fig. 5 of the drawing there is illustrated an embodiment of the invention incorporating structure for facilitating the meshing and driving operation of the pinion. As there shown a power shaft 21 has a smooth extension 22 providing a thrust shoulder 23, and a further reduced smooth extension 25 on which is mounted a screw shaft 26 whose external surface is flush with the surface of the portion 22. Screw shaft 26 is anchored to the power shaft by means of a cross pin 27. A pinion member 28 is slidably journalled on the smooth portion 22 of the power shaft and the screw shaft 26 for movement into engagement with an engine gear 29.

A flange member 31 is fixed to the pinion 28 as indicated at 30, and a flange nut 32 is threaded on the screw shaft 26. A sleeve 33 of elastic material such as rubber is seated on the nut member 32 in position to loosely engage the flange member 31 of the pinion.

In the present embodiment of the invention a barrel member 34 is arranged to surround the elastic sleeve 33 and hold it loosely confined between the flanges of members 31 and 32, and this barrel member is arranged to transmit torque directly from the elastic member 33 to the pinion 28 during the cranking operation. For this purpose the front end of the barrel 34 is provided with an inwardly extending flange 35 having notches cut therein adapted to slidably receive the teeth of the pinion 28, so as to spline the barrel to the pinion. A split lock ring 36 is provided in the open end of the barrel for holding the parts in assembled position. A centrifugal detent 37 is mounted in the screw shaft 26 under the control of a spring ring 38, said detent serving as an anti-drift when the drive is idle, and also serving to hold the pinion in engagement with the engine gear as long as the power shaft is rotating above a predetermined speed.

In this embodiment of the invention, the splined connection between the pinion and the barrel reduces the shock incident to tooth abutment between the pinion and engine gear during the meshing operation since the barrel and its associated parts may continue their longitudinal movement compressing the elastic member 33 while the pinion is arrested by such tooth abutment. At the same time, the splined connection serves to increase the torque capacity of the coupling formed by the elastic sleeve 33 due to the increased area of useful torque of said sleeve transmitting surface. The sleeve 33 is here illustrated as having a pilot portion bearing on the nut member 32, and as being bevelled off to a substantial extent as shown at 41 adjacent the open end of the barrel member 34. While these features are considered desirable, they are not considered essential to the invention and it is not desired to limit the scope of the invention thereto, nor in any other way than as defined in the claims appended hereto.

What is claimed is:

1. In an engine starter drive a power shaft, an engine driving member slidably journalled thereon, a screw shaft fixed to the power shaft, a nut on the screw shaft having a driving flange, a driven flange member fixed to the engine driving member, a body of elastically deformable material loosely mounted between said flanges, means limiting separation of the flanges to an amount slightly greater than the free length of the elastic body, thus permitting free overrunning of the engine driving member, and abutment means on the power shaft engageable by the engine driving member when in operative position to limit longitudinal movement of the engine driving member and cause the elastic body to be compressed between the flanges and thereby form a clutch connection between the nut and engine driving member.

2. A starter drive as set forth in claim 1 including, further, means responsive to rotation of the power shaft for engaging the engine driving member to resist its return to idle position.

3. An engine starter drive as set forth in claim 1 including, further, a latch member mounted on the screw shaft movable by centrifugal force to a position to engage the engine driving member and prevent its returning to idle position.

4. An engine starter drive as set forth in claim 1 including, further, unitary means for resisting disengagement of the engine driving member from the engine member, and for retaining the engine driving member in idle position.

5. In an engine starter drive, a power shaft having a stop shoulder, a smooth portion adjacent thereto and a screw-threaded element adjacent the smooth portion and flush therewith a flanged pinion member slidably journalled on the smooth portion and screw-threaded element for longitudinal movement into engagement with an engine gear, said shoulder on the power shaft defining the operative portion of the pinion member, a flanged nut on the screw-threaded element, a body of elastically deformable material loosely mounted between said flanges, means limiting the separation of the flanges and means responsive to rotation of the power shaft for holding the pinion in engagement with the engine gear.

6. In an engine starter drive, a power shaft having a stop shoulder, a smooth portion adjacent thereto and a screw-threaded element adjacent the smooth portion and flush therewith, a flanged pinion member slidably journalled on the smooth portion and screw-threaded element for longitudinal movement into engagement with an engine gear, said shoulder on the power shaft defining the operative portion of the pinion member, a flanged nut on the screw-threaded element, a body of elastically deformable material loosely mounted between said flanges, a barrel enclosing the flanges and elastically deformable material, and a detent mounted in the screw-threaded element engaging the pinion to normally retain it in idle position and to hold the pinion in engagement with the engine gear.

7. In an engine starter a power shaft, a flanged pinion member slidably journalled thereon to mesh with and rotate an engine gear, a flanged nut member having a threaded connection with the power shaft, a cylinder of elastically deformable material located between the flanges of the nut and the pinion and forming a yielding overrunning clutch therebetween, a barrel member enclosing said flanges and cylinder slidably but non-rotatably connected to the pinion, and means for holding the pinion in mesh with the engine gear as long as the power shaft rotates above a predetermined speed.

8. In an engine starter, a power shaft, a pinion member slidably journalled thereon to mesh with and rotate an engine gear, a nut member having a threaded connection with the power shaft, a cylinder of elastically deformable material located between the nut and pinion and forming a yielding overrunning clutch therebetween, a barrel member enclosing said cylinder and connecting the nut and pinion, and a detent in the path of the pinion rotatable with the power shaft and movable by centrifugal force to engage the pinion and hold it in mesh with the engine gear.

JAMES E. BUXTON.